(12) United States Patent
Wieczorek et al.

(10) Patent No.: US 8,360,251 B2
(45) Date of Patent: Jan. 29, 2013

(54) MULTI-LAYER COALESCING MEDIA HAVING A HIGH POROSITY INTERIOR LAYER AND USES THEREOF

(75) Inventors: Mark T. Wieczorek, Cookeville, TN (US); Barry M. Verdegan, Stoughton, WI (US); Saru Dawar, Madison, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 341 days.

(21) Appl. No.: 12/247,502

(22) Filed: Oct. 8, 2008

(65) Prior Publication Data

US 2011/0233152 A1    Sep. 29, 2011

(51) Int. Cl.
*B01D 35/00* (2006.01)
*B01D 29/00* (2006.01)
*B01D 17/02* (2006.01)

(52) U.S. Cl. ........ 210/488; 210/307; 210/435; 210/489; 210/490; 210/491; 210/492; 210/799

(58) Field of Classification Search ............... 210/788, 210/799, 483, 767, 500.1, 500.22, 488–492, 210/DIG. 5; 55/486, 487, 522, 527; 585/818
See application file for complete search history.

(56) References Cited

U.S. PATENT DOCUMENTS

| | | | |
|---|---|---|---|
| 3,228,527 A * | 1/1966 | McPherson | 210/307 |
| 3,951,814 A | 4/1976 | Krueger | |
| 3,960,719 A | 6/1976 | Bresson | |
| 4,039,441 A | 8/1977 | Fett | |
| 4,050,237 A * | 9/1977 | Pall et al. | 60/39.08 |
| 4,052,316 A | 10/1977 | Berger, Jr. et al. | |
| 4,078,965 A * | 3/1978 | Berger et al. | 162/156 |
| 4,081,373 A | 3/1978 | Rozniecki | |
| 4,083,778 A | 4/1978 | McGrew | |
| 4,199,447 A | 4/1980 | Chambers et al. | |
| 4,213,863 A | 7/1980 | Anderson | |
| 4,251,369 A | 2/1981 | Casad et al. | |
| 4,304,671 A | 12/1981 | Labaquere | |
| 4,640,781 A | 2/1987 | Hughes | |
| 4,643,834 A | 2/1987 | Batutis | |
| 4,759,782 A * | 7/1988 | Miller et al. | 55/487 |
| 4,790,947 A | 12/1988 | Arnold | |
| 4,888,117 A | 12/1989 | Brown et al. | |
| 5,006,260 A | 4/1991 | Roques et al. | |
| 5,037,454 A | 8/1991 | Mann | |
| 5,068,035 A | 11/1991 | Mohr | |
| 5,080,802 A | 1/1992 | Cairo, Jr. et al. | |
| 5,084,170 A | 1/1992 | Janik et al. | |
| 5,112,498 A | 5/1992 | Davies | |
| 5,156,745 A | 10/1992 | Cairo, Jr. et al. | |
| 5,174,907 A | 12/1992 | Chown et al. | |

(Continued)

OTHER PUBLICATIONS

DelStar Technologies, Inc., (C) 2009.*

(Continued)

*Primary Examiner* — Benjamin Kurtz
(74) *Attorney, Agent, or Firm* — Andrus, Sceales, Starke & Sawall, LLP

(57) ABSTRACT

Disclosed are coalescing media for coalescing a mixture of two phases, namely a continuous phase and a dispersed phase. The disclosed coalescing media has multiple layers with distinct porosities, where an interior layer of the coalescing media has a higher porosity than the layers immediately adjacent to the interior layer. The disclosed media may be utilized in coalescers, coalescing systems, or coalescing methods for removing the dispersed phase from the mixture.

25 Claims, 6 Drawing Sheets

U.S. PATENT DOCUMENTS

| | | | |
|---|---|---|---|
| 5,242,604 A | 9/1993 | Young et al. | |
| 5,401,404 A | 3/1995 | Strauss | |
| 5,417,848 A | 5/1995 | Erdmannsdorfer et al. | |
| 5,439,588 A | 8/1995 | Chown et al. | |
| 5,443,724 A | 8/1995 | Williamson et al. | |
| 5,450,835 A | 9/1995 | Wagner | |
| 5,454,937 A | 10/1995 | Lewandowski | |
| 5,454,945 A | 10/1995 | Spearman | |
| 5,468,385 A | 11/1995 | Inoue | |
| 5,480,547 A | 1/1996 | Williamson et al. | |
| 5,500,132 A | 3/1996 | Elmi | |
| 5,565,078 A | 10/1996 | Sams et al. | |
| 5,575,896 A | 11/1996 | Sams et al. | |
| 5,616,244 A | 4/1997 | Seureau et al. | |
| 5,643,431 A | 7/1997 | Sams et al. | |
| 5,656,166 A | 8/1997 | Linnersten et al. | |
| 5,656,173 A | 8/1997 | Jordan et al. | |
| 5,669,366 A | 9/1997 | Beach et al. | |
| 5,750,024 A | 5/1998 | Spearman | |
| 5,762,810 A | 6/1998 | Pelton et al. | |
| 5,800,597 A | 9/1998 | Perrotta et al. | |
| 5,861,087 A | 1/1999 | Manning | |
| 5,874,008 A | 2/1999 | Hirs | |
| 6,017,300 A | 1/2000 | Herman | |
| 6,019,717 A | 2/2000 | Herman | |
| 6,056,128 A | 5/2000 | Glasgow | |
| 6,083,380 A | 7/2000 | Selby et al. | |
| 6,123,061 A | 9/2000 | Baker et al. | |
| 6,139,595 A | 10/2000 | Herman et al. | |
| 6,149,408 A | 11/2000 | Holt | |
| 6,302,932 B1 | 10/2001 | Unger et al. | |
| 6,332,987 B1* | 12/2001 | Whitney et al. | 210/799 |
| 6,354,283 B1 | 3/2002 | Hawkins et al. | |
| 6,358,416 B1 | 3/2002 | Miller et al. | |
| 6,413,429 B1* | 7/2002 | Breman et al. | 210/634 |
| 6,419,721 B1 | 7/2002 | Hunter | |
| 6,422,396 B1 | 7/2002 | Li et al. | |
| 6,517,615 B2 | 2/2003 | Miller et al. | |
| 6,533,935 B2 | 3/2003 | Miller et al. | |
| 6,569,330 B1* | 5/2003 | Sprenger et al. | 210/315 |
| 6,601,385 B2 | 8/2003 | Verdegan et al. | |
| 6,605,224 B2 | 8/2003 | Aymong | |
| 6,610,198 B1 | 8/2003 | Jiang et al. | |
| 6,640,792 B2 | 11/2003 | Harvey et al. | |
| 6,641,742 B2 | 11/2003 | Prater et al. | |
| 6,722,123 B2 | 4/2004 | Liu et al. | |
| 6,730,236 B2 | 5/2004 | Kouba | |
| 6,740,358 B2 | 5/2004 | Speece, Jr. et al. | |
| 6,758,980 B2* | 7/2004 | Prater et al. | 210/767 |
| 6,767,459 B1 | 7/2004 | Sinker et al. | |
| 6,771,808 B1 | 8/2004 | Wallack | |
| 6,811,693 B2 | 11/2004 | Nilsen et al. | |
| 6,907,997 B2 | 6/2005 | Thacker et al. | |
| 7,198,718 B1 | 4/2007 | Turnbull | |
| 7,235,177 B2 | 6/2007 | Herman et al. | |
| 7,238,216 B2 | 7/2007 | Malgorn et al. | |
| 7,297,279 B2 | 11/2007 | Johnson et al. | |
| 7,323,106 B2 | 1/2008 | Jaroszczyk et al. | |
| 7,326,266 B2 | 2/2008 | Barnwell | |
| 7,328,572 B2 | 2/2008 | McKinley et al. | |
| 7,406,960 B2 | 8/2008 | Knauf et al. | |
| 7,416,657 B2 | 8/2008 | Kretchmar | |
| 2002/0036163 A1 | 3/2002 | Miller et al. | |
| 2003/0010002 A1* | 1/2003 | Johnson et al. | 55/486 |
| 2003/0070424 A1 | 4/2003 | Verdegan et al. | |
| 2003/0102268 A1 | 6/2003 | Prater et al. | |
| 2004/0094459 A1* | 5/2004 | Prater et al. | 210/90 |
| 2005/0026526 A1 | 2/2005 | Verdegan et al. | |
| 2006/0207234 A1* | 9/2006 | Ward et al. | 55/524 |
| 2006/0242933 A1* | 11/2006 | Webb et al. | 55/486 |
| 2006/0283815 A1 | 12/2006 | Wieczorek | |
| 2007/0021021 A1 | 1/2007 | Verdegan et al. | |
| 2007/0039865 A1* | 2/2007 | Jiang et al. | 210/259 |
| 2007/0045167 A1 | 3/2007 | Jaroszczyk et al. | |
| 2007/0062886 A1 | 3/2007 | Rego et al. | |
| 2007/0062887 A1* | 3/2007 | Schwandt et al. | 210/799 |
| 2007/0107399 A1 | 5/2007 | Schwandt et al. | |
| 2007/0131235 A1* | 6/2007 | Janikowski et al. | 131/332 |
| 2007/0131609 A1* | 6/2007 | Ramaswamy et al. | 210/490 |
| 2007/0289915 A1 | 12/2007 | Jiang et al. | |
| 2008/0035586 A1 | 2/2008 | Chen et al. | |
| 2008/0053888 A1 | 3/2008 | Ellis et al. | |
| 2008/0105629 A1 | 5/2008 | Yang et al. | |
| 2008/0121026 A1 | 5/2008 | Verdegan | |
| 2008/0179263 A1 | 7/2008 | Wieczorek et al. | |
| 2009/0188870 A1 | 7/2009 | Schroeder et al. | |
| 2010/0252510 A1* | 10/2010 | Godsay et al. | 210/806 |

OTHER PUBLICATIONS

"To Merge, Drops Must Separate", Phys. Rev. Lett. 100, 02401 (issue of Jan. 18, 2008), http://focus.aps.org, 3 pgs.

International Search Report and Written Opinion in corresponding application PCT/US09/059983, having a mailing date of Dec. 4, 2009.

International Preliminary Report on Patentability for PCT/US2009/059983 dated Apr. 12, 2011.

International Search Report for PCT/US2011/031259 dated Oct. 28, 2011.

Written Opinion for PCT/US2011/031259 dated Oct. 28, 2011.

* cited by examiner

MULTI-LAYER COALESCING MEDIA HAVING A HIGH POROSITY INTERIOR LAYER AND USES THEREOF

BACKGROUND

The field of the invention relates to coalescing media, coalescing systems, and methods for coalescing a mixture of two phases, namely a continuous phase and a dispersed phase. In particular, the field relates to coalescing media, coalescing systems, and methods for coalescing drops of the dispersed phase in order to collect and remove the dispersed phase from the mixture.

Coalescers are used widely to remove immiscible droplets from a gaseous or liquid continuous phase, such as in crankcase ventilation filtration, fuel water separation, and oil-water separation. Prior art coalescer designs incorporate the principles of enhanced droplet capture and coalescence by utilizing graded capture (i.e., decreasing fiber diameter, pore size and/or porosity in coalescing media) or by utilizing thick depth coalescers. Often, prior art coalescing media may have a more open layer upstream of an interior layer in order to increase life of the coalescer or downstream of an interior layer to increase the size of released drops. Wettability also is recognized as affecting coalescer performance. (See, e.g. U.S. Pat. No. 6,767,459 and U.S published Patent Application Nos. 2007-0131235 and 2007-0062887). U.S. Pat. No. 5,443,724 discloses that the media should have a surface energy greater than water in order to improve coalescer performance (i.e., that the media should be preferentially wetted by both coalescing droplets and continuous phases). U.S. Pat. No. 4,081,373 discloses that coalescing media should be hydrophobic in order to remove water from fuel. U.S. published Patent Application No. 2006-0242933 discloses an oil-mist coalescer in which the filtration media is oleophobic, thereby enabling the fluid mist to coalesce into droplets and drain from the filtration media. This published application also discloses that a second media layer optionally may be hydrophobic.

With regard to the removal of water from fuel, there is a need to increase removal efficiency and to remove smaller droplets than in the past, in order to protect high pressure rail fuel-injection systems. This challenge is further magnified by the introduction of new fuels, including ultra-low sulfur diesel (ULSD) and biodiesels with lower interfacial tensions and different additive packages, than fuels in the past. In fuels with lower interfacial tension, the size of dispersed drops is decreased, making the drops more difficult to remove. Enhanced coalescence therefore is needed to meet these challenges. Improved coalescers that include improved coalescing media also are desirable because they permit the use of a smaller media pack in view of improved coalescing efficiency. In fuels with lower interfacial tension, the size of drops is decreased, making the drops more difficult to remove. Enhanced coalescence therefore is needed to meet these challenges. Improved coalescers that include improved coalescing media also are desirable because they permit the use of a smaller media pack in view of improved coalescing efficiency.

SUMMARY

Disclosed are coalescing media for coalescing a mixture of two phases, namely a continuous phase and a dispersed phase. The disclosed media may be utilized in coalescers, systems, and methods in order to collect and remove the dispersed phase from the mixture.

The disclosed coalescing media is configured for capturing droplets of a dispersed phase from a mixture of the dispersed phase and a continuous phase. The mixture is passed from upstream to downstream through the media and captured droplets of the dispersed phase coalesce and grow in the coalescing media to a sufficient size whereby they are released from the coalescing media. The coalescing media includes at least three adjacent layers that extend in series from the upstream direction to the downstream direction, namely a first layer, a second layer, and a third layer. The first layer, the second layer, and the third layer have porosities $\epsilon_1$, $\epsilon_2$, and $\epsilon_3$, respectively, and $\epsilon_2 > \epsilon_1$ and $\epsilon_2 > \epsilon_3$.

In some embodiments, a coalescer or coalescer system as contemplated herein may include the disclosed coalescing media contained in a housing. The housing may include an upstream inlet structured to receive the mixture, a first downstream outlet structured to discharge the mixture after coalescing, and optionally a second downstream outlet structure to discharge the coalesced dispersed phase.

The disclosed coalescers, coalescing systems, and methods may be utilized to coalesce any suitable mixture that includes a continuous phase and a dispersed phase. In some embodiments, the continuous phase and the dispersed are immiscible liquids. For example, the disclosed systems and methods may be configured or utilized for coalescing water dispersed in a hydrocarbon liquid (e.g., hydrocarbon fuel, biodiesel fuel, or lubricating, hydraulic, or transmission oil). In other embodiments, the continuous phase is water and the dispersed phase is hydrocarbon liquid. In further embodiments, the continuous phase is a gas and the dispersed phase is a liquid.

The disclosed coalescing media includes at least three adjacent layers that extend in series from upstream to downstream, namely a first layer, a second layer, and a third layer. The second layer has a porosity ($\epsilon_2$) that is greater than the porosity of the first layer ($\epsilon_1$) and that is greater than the porosity of the third layer ($\epsilon_3$). In some preferred embodiments, $\epsilon_1 = 0.88$ to $0.92$ (and most preferably about $\epsilon_1 = 0.91$); $\epsilon_2 = 0.94$ to $0.96$ (and most preferably $\epsilon_2 = 0.96$); and $\epsilon_3 = 0.88$ to $0.92$ (and most preferably $\epsilon_3 = 0.92$). The layers may be characterized by their solidities (where solidity is defined as 1 minus $\epsilon$ for a particular layer). In some embodiments, the solidity of the second layer is no more than about 75% as much as the solidity of the first layer (or no more than about 50% as much as the solidity of the first layer); and the solidity of the second layer is no more than about 75% as much as the solidity of the third layer (or no more than about 50% as much as the solidity of the third layer).

In the disclosed coalescing media, the first layer, the second layer, and the third layer have mean flow pore diameters, $M_1$, $M_2$, and $M_3$, respectively. Preferably, $M_2 > M_1$ and $M_2 > M_3$. In some embodiments, $M_2$ is at least about 1.5 times greater than $M_1$ (preferably at least about 2 times greater than $M_1$) and at least about 1.5 times greater than $M_3$ (preferably at least about 2 times greater than $M_3$). In further embodiments, $M_1$ may be about 1-30 μm (or about 5-10 μm); $M_2$ may be about 10-100 μm (or about 25-50 μm); and $M_3$ may be about 0.1-10 μm (or about 1-5 μm).

In the disclosed coalescing media, the first layer, the second layer, and the third layer have thicknesses $T_1$, $T_2$, and $T_3$, respectively. Thickness refers to the dimension through the media (or layer) in a direction of flow of the mixture. Preferably $T_2 > T_3$ and optionally $T_2 > T_1$. In some embodiments, $T_2$ may be at least about 30 μm. In further embodiments, $T_1 > T_2$ and $T_2 > T_3$, for example, in order to minimize pressure drops. In even further embodiments, $T_3$ may be about 0.01-0.1 mm (i.e., 10-100 μm).

In some embodiments of the coalescing media, the first layer, the second layer, and the third layer may have distinct void volumes (e.g., where void volume is a function of $\epsilon$ and W). For example, optionally, the second layer may have a higher void volume than the first layer; the second layer may have a higher void volume than the third layer; or the second layer may have a higher void volume than both the first layer and the third layer.

In the disclosed coalescing media, the first layer, the second layer, and the third layer have capillary pressures, $P_1$, $P_2$, and $P_3$, respectively. Preferably $P_2 \geq P_3$ and optionally $P_2 \geq P_1$. Capillary pressure for a layer may be defined as:

$$P_l = \frac{2\gamma \cos \theta_l}{M_l}$$

where P=local capillary pressure for the indicated layer;
$\gamma$=interfacial tension;
$\theta$=contact angle of a drop on the media in the fluid for the indicated layer; and
M=mean flow pore diameter for the indicated layer.

In the following discussion, when comparing capillary pressures of adjacent layers, the variable terms $\gamma$ will cancel out, because the two layers will be contacted with the same fluid simultaneously. As such, capillary pressure for a layer relative to an adjacent layer may be defined by an equation $\cos \theta/M$ in which $\theta$ is a contact angle for a drop of dispersed phase on the layer, as defined herein below, and M is mean flow pore diameter for the layer. In some embodiments, $\theta_1$, $\theta_2$, and $\theta_3$, for the first, second, and third layer, respectively, may be as follows: $45° \leq \theta_1 \leq 135°$; $60° \leq \theta_2 \leq 135°$; and $\theta_3 \geq 90°$ (preferably $\theta_3 \geq 120°$).

The disclosed coalescing media has at least three adjacent layers that extend in series from upstream to downstream, namely a first layer, a second layer, and a third layer. In some embodiments, the three adjacent layers may extend in series from upstream to downstream in an axial direction (e.g., where the coalescing media is configured in a linear coalescer element), or in other embodiments the three adjacent layers may extend in series from upstream to downstream in a radial direction (e.g., where the coalescing media is configured in a cylindrical coalescer element). The coalescing media also may be configured in a flat-panel or other arrangement. The coalescing media may include additional layers provided that the media includes at least one layer having a relatively high porosity in relation to an adjacent upstream layer and a downstream adjacent layer, as described above. In some embodiments, the coalescing media includes at least five adjacent layers that extend in series from upstream to downstream, namely a pre-layer, a first layer, a second layer, a third layer, (in which the first layer, the second layer, and the third layer are as described above), and a post-layer. The pre-layer, the first layer, the second layer, the third layer, and the post-layer, have porosities $\epsilon_{Pre}$, $\epsilon_1$, $\epsilon_2$, $\epsilon_3$, and $\epsilon_{Post}$, respectively, and preferably $\epsilon_{Pre} > \epsilon_1$, $\epsilon_2 > \epsilon_1$, $\epsilon_2 > \epsilon_3$ and $\epsilon_{Post} > \epsilon_3$.

Where the coalescing media includes at least five adjacent layers, the pre-layer, the first layer, the second layer, the third layer, and the post-layer have mean flow pore diameters, $M_{Pre}$, $M_1$, $M_2$, $M_3$, and $M_{Post}$, respectively. Preferably, $M_{Pre} > M_1$, $M_2 > M_1$, $M_2 > M_3$, and $M_{Post} > M_3$.

Where the coalescing media includes at least five adjacent layers, the pre-layer, the first layer, the second layer, the third layer, and the post-layer have capillary pressures, $P_{Pre}$, $P_1$, $P_2$, $P_3$, and $P_{Post}$, respectively. Preferably $P_2 \geq P_3$, and optionally $P_1 \geq P_{Pre}$, $P_2 \geq P_1$, and $P_{Post} \geq P_3$. As discussed herein, capillary pressure for a layer relative to an adjacent layer may be defined by an equation $\cos \theta/M$ in which $\theta$ is a contact angle for a drop of water on the layer, as defined herein below, and M is mean flow pore diameter for the layer. In some embodiments, $\theta_{Pre}$, $\theta_1$, $\theta_2$, $\theta_3$, and $\theta_{Post}$, for the pre-layer, the first layer, the second layer, the third layer, and the post-layer, respectively, may be defined as follows: $\theta_{Pre} \geq 45°$; $45° \leq \theta_1 \leq 135°$; $60° \leq \theta_2 \leq 135°$; $\theta_3 \geq 90°$ (preferably $\theta_3 \geq 120°$); and $\theta_{Post} \geq 90°$ (preferably $\theta_{Post} \geq 120°$).

In some embodiments, the disclosed coalescing media may be configured for use in a coalescer, a coalescing system, or a coalescing method. The disclosed coalescers, coalescing systems, and coalescing methods may include or utilize the disclosed coalescing media for coalescing a dispersed phase from a mixture of the dispersed phase in a continuous phase. Optionally, the coalescers, coalescing systems, and coalescing methods may include or utilize additional media. In some embodiments, the disclosed coalescers, coalescing systems, and coalescing methods further may include or further may utilize a hydrophobic media for removing water, where the hydrophobic media is positioned downstream of the coalescing media.

The disclosed coalescing media may be utilized in coalescers, coalescing systems, and coalescing methods for removing a dispersed phase from a continuous phase. In some embodiments, the coalescing media may be utilized in coalescers, systems, or methods for removing water dispersed in hydrocarbon fuel, biodiesel fuel, or lubricating, hydraulic or transmission oil. Preferably, the coalescing media may be utilized in coalescers, systems, or methods for removing at least about 93% of water dispersed in liquid hydrocarbon fuel (more preferably at least about 95% of water dispersed in liquid hydrocarbon fuel, even more preferably at least about 97% of water dispersed in liquid hydrocarbon fuel, most preferably at least about 99% of water dispersed in liquid hydrocarbon fuel). In some embodiments of the coalescers, coalescing systems, and coalescing methods, the continuous phase is water and the dispersed phase is hydrocarbon liquid. In other embodiments of the coalescers, coalescing systems, and coalescing methods, the continuous phase is a gas and the dispersed phase is a liquid.

DETAILED DESCRIPTION

Disclosed are coalescing media and coalescers, systems and methods which utilize the disclosed coalescing media for coalescing a mixture of two phases, namely a continuous phase and a dispersed phase. The disclosed coalescing media may be utilized in coalescers, systems, or methods in order to collect and remove the dispersed phase from the mixture.

The coalescing media comprises multiple layers, which include at least three adjacent layers that extend in series from the upstream direction to the downstream direction, namely a first layer, a second layer, and a third layer. As contemplated herein, each layer has a desirable porosity, solidity, flow pore diameter, and capillary pressure. The terms "porosity," "solidity," "flow pore diameter," and "capillary pressure" may refer to "average" or "mean" values for these terms (e.g., where a layer is graded and "porosity," "solidity," "flow pore diameter," and "capillary pressure" are reported as average porosity, average solidity, mean flow pore diameter, and average capillary pressure for the graded layer).

The coalescing media disclosed herein may be utilized to coalesce a dispersed phase from a mixture of the dispersed phase in a continuous phase. Mixtures contemplated herein may include mixtures of a hydrophobic liquid (e.g., a hydrocarbon liquid) and an aqueous liquid (e.g., water). In some embodiments, the continuous phase may be a hydrocarbon liquid and the dispersed phase may be water. In other embodiments, the continuous phase may be water and the dispersed phase may be a hydrocarbon liquid. As contemplated herein, a hydrocarbon liquid primarily includes hydrocarbon material but further may include non-hydrocarbon material (e.g., up to about 1%, 5%, 10%, or 20% non-hydrocarbon material).

Figure 1:
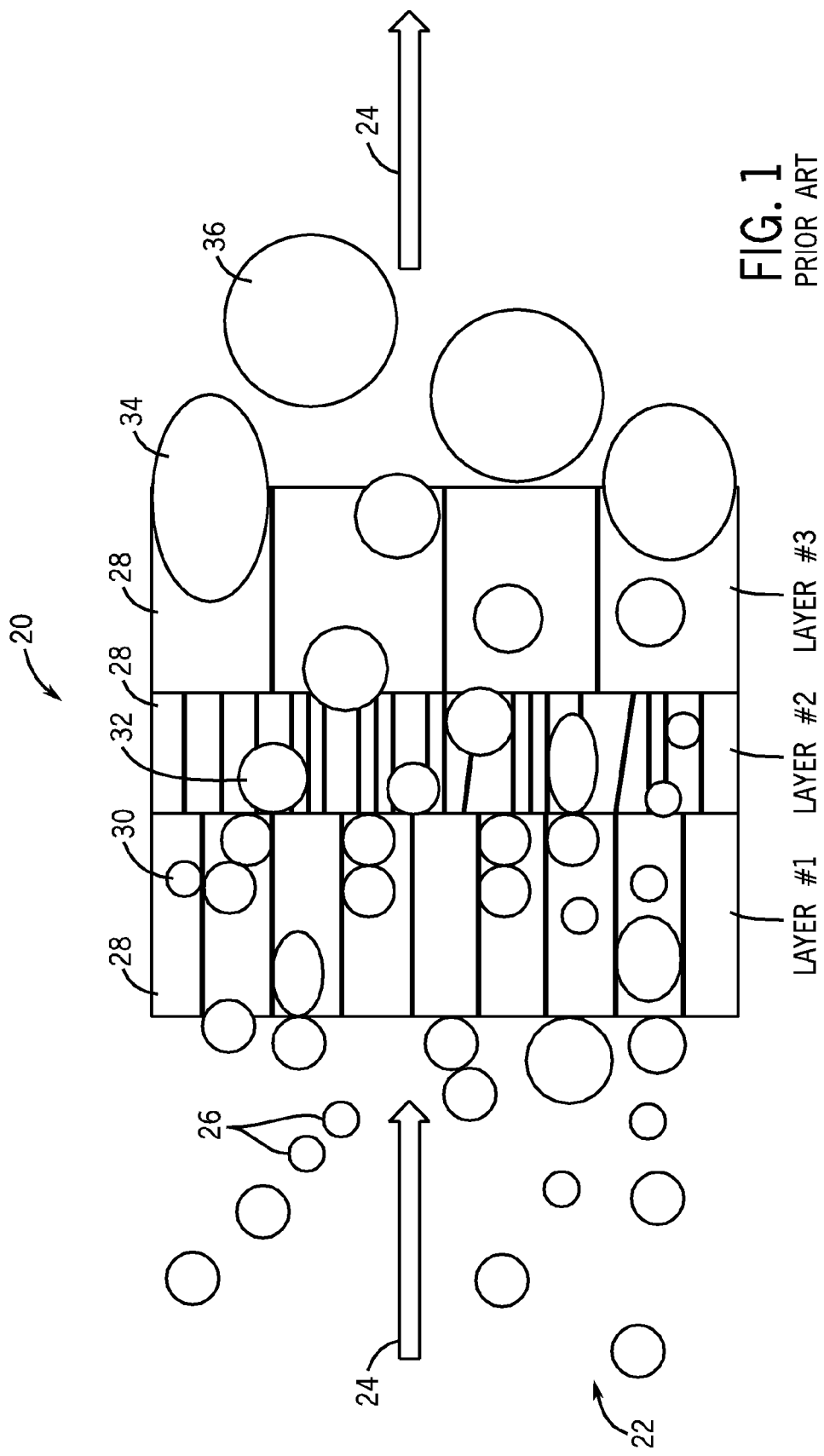
FIG. 1 illustrates coalescing media of the prior art.

FIG. 1 shows a coalescing media 20 of the prior art for coalescing a mixture 22 having two immiscible phases, namely a continuous phase 24 and a dispersed phase 26. For example, the continuous phase 24 may include hydrocarbon liquid, and the dispersed phase may include water, e.g. in the form of a fine mist having droplets 26 of about one micron and smaller in diameter. The continuous phase 24 flows from upstream to downstream, i.e. left to right in FIG. 1. The coalescing media includes fibrous material 28 capturing droplets of the dispersed phase, coalescingly growing the droplets into larger drops, for example as shown at 30, 32, which further coalesce and grow to form larger drops such as 34 which are released from the media as shown at 36. Within the continuous phase 24, droplets 26 can collide and grow in size by drop-to-drop coalescence. Upon entry into the coalescing media 20, the droplets are captured by impaction, interception, diffusion, electrostatic, or other filtration mechanisms. Droplets grow in size as captured and uncaptured droplets coalesce to form larger drops 34. The enlarged drops flow through the bed of fibrous media and are released as shown at 36. The media includes three layers (Layer #1, Layer #2, and Layer #3). The media includes an interior layer (Layer #2) having relatively low porosity in relation to an adjacent upstream layer (Layer #1) and in relation to a downstream adjacent layer (Layer #3). As discussed herein and understood in the art, porosity is determined by parameters that include, but are not limited to fiber diameter of the media (d), and mean flow pore size of the media (M).

Figure 2:
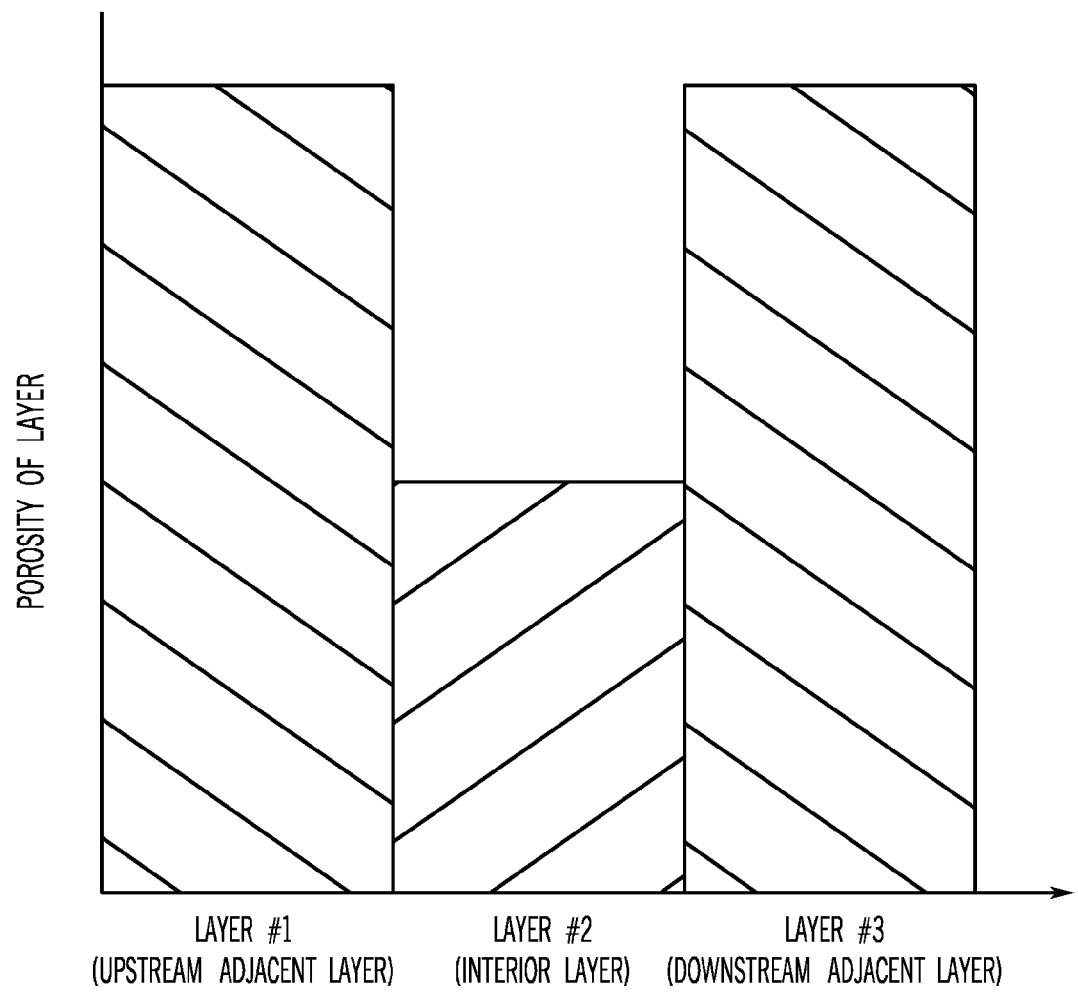
FIG. 2 graphically illustrates coalescing media of the prior art comprising three layers and including an interior layer having a relatively low porosity and in relation to an adjacent upstream layer and a downstream adjacent layer.

FIG. 2 graphically illustrates coalescing media of the prior art having three layers for graded capture (i.e., Layer #1, Layer #2, and Layer #3). The media includes an interior layer (Layer #2) having a relatively low porosity in relation to an adjacent upstream layer (Layer #1) and a downstream adjacent layer (Layer #3).

The coalescing media disclosed herein, which for example may be utilized to remove water from fuel (e.g., hydrocarbon fuel or biodiesel fuel), include fibrous media or media layers that induces a change in fluid velocity and a change in droplet surface area to enhance coalescence of the dispersed phase. The coalescing media disclosed herein typically has at least three layers from upstream to downstream, including a first moderate velocity layer, a second lower velocity layer, and a third higher velocity layer. The two drops are held up at the juncture between the second and third layer where the two drops coalesce.

Figure 3:
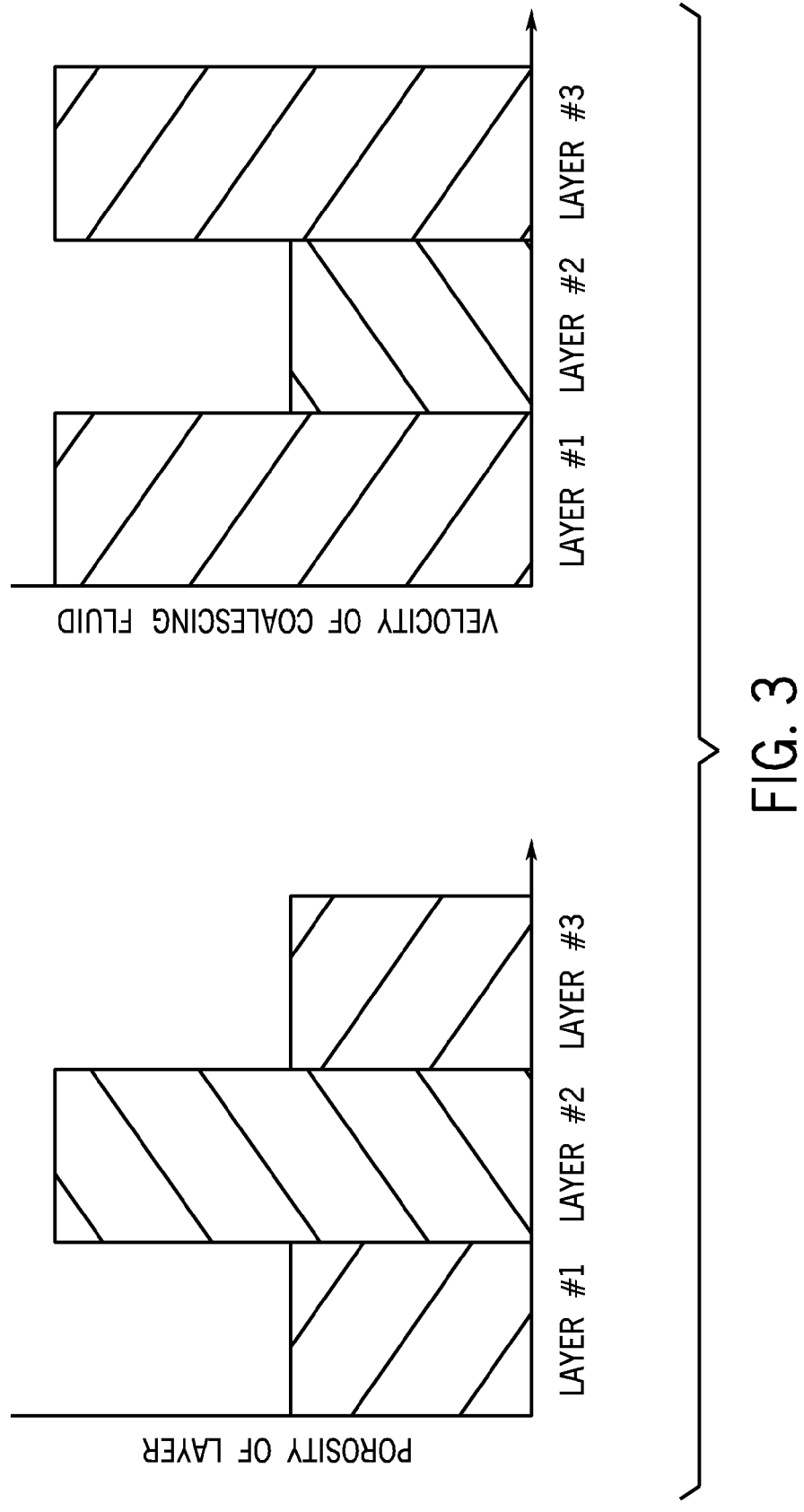
FIG. 3 graphically describes one embodiment of coalescing media as contemplated herein having three layers of distinct porosities in which drops of a coalescing dispersed phase exhibit distinct velocities.

The coalescing media disclosed herein typically includes an interior layer (see Layer #2, FIG. 3) in which a coalescing fluid exhibits a low velocity relative to an upstream adjacent layer (see Layer #1, FIG. 3) and relative to a downstream adjacent layer (see Layer #3, FIG. 3). The interior layer (see Layer #2, FIG. 3) typically has a higher porosity and optionally may have a higher void volume relative to an upstream adjacent layer (see Layer #1, FIG. 3) and relative to a downstream adjacent layer (see Layer #3, FIG. 3). The interior layer may be configured such that flow of the coalescing fluid through the layer is of relatively low velocity, uniform, and calm. Smaller diameter water droplets that previously have passed through the upstream adjacent layer may coalesce as they pass out of the interior layer into the downstream adjacent layer, overcoming the effect of electrostatic stabilization which, for example, may be caused by surfactants in the coalescing fluid. This configuration of the coalescing media concentrates droplets and places them in close proximity to one another in the interior layer, if not actually touching one another. Then, the leading droplet in the interior layer is accelerated through smaller pores in the downstream adjacent layer, causing adjacent droplets to combine into a single, larger droplet. In addition, as leading droplets exit the interior layer and enter the smaller pores of the downstream adjacent layer, their shape may become deformed and their surface area may increase, causing a transient increase in interfacial tension that further causes adjacent droplets to combine into a single, larger droplet. The pore sizes for the low velocity layer and the adjacent layers may be selected to target a desirable water droplet diameter (e.g., based on the fluid system in use and the expected droplet size generated by pumps and other equipment). The upstream adjacent layer may be configured to induce larger water droplets to coalesce, and may act as a solid or semi-solid particle separator to prevent the interior layer and downstream layers from clogging with debris. Each layer may be configured based on physical properties to induce these velocities, for example based on porosity ($\epsilon$) for the layer, mean flow pore diameter (M) for the layer, and capillary pressure (P) for the layer. Each layer also may be configured based on physical properties to target water droplets of selected droplet sizes. In addition, the drop wetting characteristics of the media may be selected to further enhance droplet coalescence.

Figure 4:
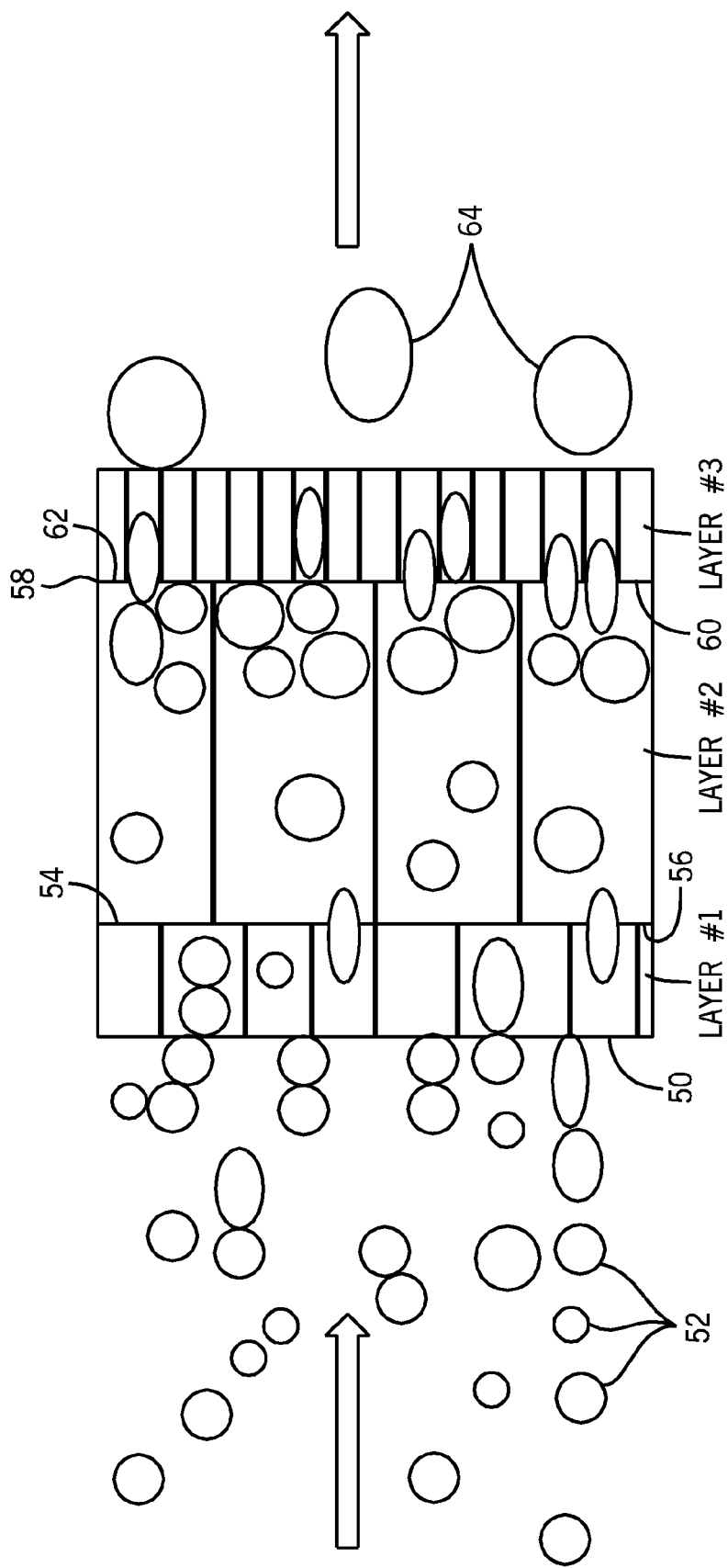
FIG. 4 schematically illustrates one embodiment of coalescing media as contemplated herein having three layers.

FIG. 4 illustrates one embodiment of coalescing media as contemplated herein including at least three layers. Layer #1 has a relatively moderate porosity $\epsilon_1$ and a relatively moderate mean flow pore diameter $M_1$. Coalescing droplets passing through Layer #1 exhibit a relatively moderate velocity. Layer #2 has a relatively high porosity $\epsilon_2$ and a relatively high mean flow pore diameter $M_2$. Coalescing droplets passing through Layer #2 exhibit a relatively low velocity. Layer #3 has a relatively low porosity $\epsilon_3$ and a relatively low mean flow pore diameter $M_2$. Coalescing droplets passing through Layer #3 exhibit a relatively high velocity. Optionally, Layer #2 has a larger void volume than Layer #1, Layer #3, or both Layer #1 and Layer #3.

In FIG. 4, a mixture that includes a continuous phase and dispersed phase enters the media at an upstream face of Layer #1 50 and droplets in the dispersed phase 52 begin to coalesce in Layer #1. The coalescing droplets pass from the downstream face of Layer #1 54 and enter the upstream face of Layer #2 56. The velocity of the droplets is slower in Layer #2 relative to the velocity of the droplets in Layer #1. The droplets further congregate and coalesce at the juncture of Layer #2 and Layer #3 58. The coalescing droplets further pass from the downstream face of Layer #2 60 and enter the upstream face of Layer #3 62. The velocity of the droplets is higher in Layer #3 relative to the velocity of the droplets in Layer #2. In addition, the surface area of individual droplets is higher in Layer #3 relative to the surface area of individual droplets in Layer #2. The droplets further coalesce and are released from the media 64.

Figure 5:
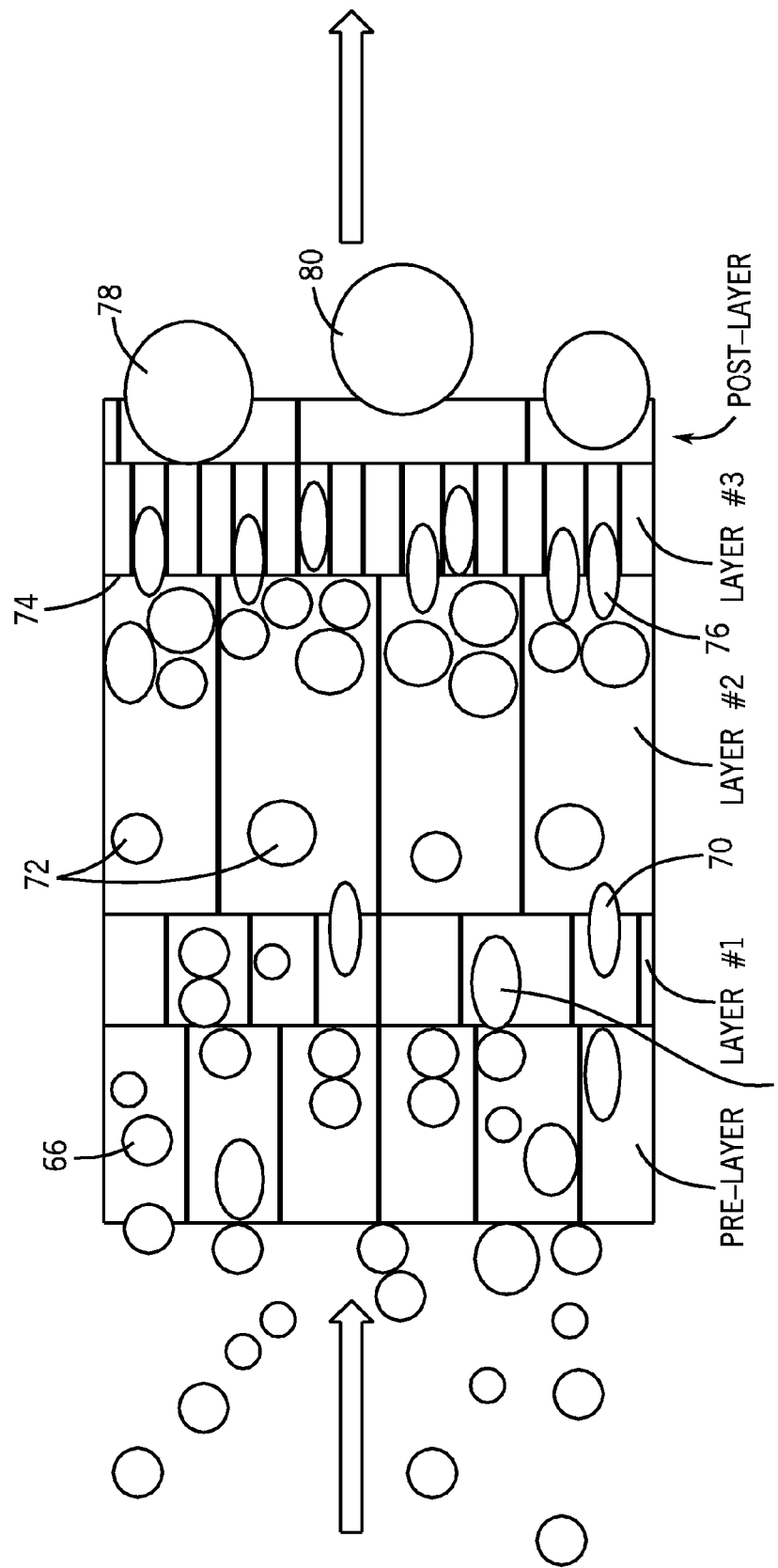
FIG. 5 schematically illustrates another embodiment of coalescing media as contemplated herein having five layers.

FIG. 5 illustrates another embodiment of coalescing media that includes five layers, i.e., a layer with relatively small pore size upstream (labeled as Layer #1), followed by a middle layer with a larger pore size than Layer #1 (labeled as Layer #2), followed by another layer with a smaller pore size than Layer #2 (labeled as Layer #3). The layers labeled as "Pre-layer" and "Post-layer" in FIG. 5 are optional. Layer #1 is configured to coalesce drops that can be removed and coalesced in the traditional manner. Layer #2 is configured to decrease fluid velocity, concentrate drops and droplets, and to decrease the surface area of drops by enabling them to achieve near spherical shape. In Layer #2, it is desirable that droplets move closer to each other. Layer #2 may be thicker than Layer #1 and Layer #3, in order to facilitate drop accumulation and to achieve near spherical shape for the drops. Layer #3 is configured to function as a barrier (causing drops to concentrate in the preceding layers), to increase fluid velocity, and to increase the surface area of drops as they enter the smaller pores, all of which may facilitate coalescence. The porosity of Layer #3 is less than that of Layer #2 in order to achieve the desired increase in fluid velocity. As for the other layers, Layer #3 may have pore size, porosity, and fiber diameter characteristics selected to remove the targeted water droplet sizes and yield the desired removal efficiency.

The coalescing media described herein include multiple layers that differ in mean flow pore size, porosity, fiber diameter, and drop contact angle in order to achieve the desired changes in velocity and drop surface area. The multiple layers may be defined in a composite media that functions as a coalescing media as contemplated herein. Alternatively, the multiple layers may be sheets of separate, individual, or discrete media that are combined to form the coalescing media as contemplated herein. The coalescing media, as described herein, may comprise layers of fibrous material (e.g., polymer, glass, ceramic, or metal fibers) in a composite filter media, or may comprise individual layers of different filter media with appropriate characteristics overlaid on one another and physically or chemically held together. Typically, in liquid-liquid coalescence applications, a separate separator or stripping stage is placed downstream and separated from the coalescing media described in this invention (e.g., hydrophobic material for removing water). Each layer of the multiple layers (i.e., the optional pre-layer, Layer #1, Layer #2, Layer #3, and the optional post-layer) may be homogenous or heterogenous. The terms "porosity," "fiber diameter," and "drop contact angle" for a layer may refer to "average porosity," "average fiber diameter," and "average drop contact angle" for that layer.

The coalescing media described herein includes layers that may comprise material having distinct hydrophilicity or hydrophobicity. For water coalescing media, the layers of media may comprise hydrophilic material. Alternatively, the coalescing media may include one layer comprising relatively hydrophilic material and another layer comprising relatively hydrophobic material. For example, in FIG. 4, Layer #1 may comprise material that is neither strongly hydrophobic nor strongly hydrophilic (but preferably material that is hydrophilic); Layer #2 may comprise material that is relatively hydrophilic in comparison to the material of Layer #3; and Layer #3 may comprise material that is relatively hydrophobic (e.g., where $\theta \geqq 90°$). In FIG. 5, the Pre-layer and Layer #1 may comprise material that is neither strongly hydrophobic nor strongly hydrophilic (but preferably material that is hydrophilic); Layer #2 may comprise material that is relatively hydrophilic in comparison to the material of Layer #3; Layer #3 may comprise material that is relatively hydrophobic; and optionally the Post-layer may comprise material that is relatively hydrophobic.

The layers of the coalescing media disclosed herein may have distinct void volumes. For example, interior Layer #2 of FIG. 4 may have a greater void volume than the adjacent layers, Layer #1 and Layer #3, FIG. 4. Similarly, interior Layer #2 of FIG. 5 may have a greater void volume than the adjacent layers, Layer #1 and Layer #3, FIG. 5.

The coalescing media disclosed herein may be utilized in coalescers, coalescing elements, coalescing filters, coalescing apparatuses, coalescing assemblies, coalescing systems, and coalescing methods disclosed in the art. (See, e.g., U.S. Pat. Nos. 7,416,657; 7,326,266; 7,297,279; 7,235,177; 7,198,718; 6,907,997; 6,811,693; 6,740,358; 6,730,236; 6,605,224; 6,517,615; 6,422,396; 6,419,721; 6,332,987; 6,302,932; 6,149,408; 6,083,380; 6,056,128; 5,874,008; 5,861,087; 5,800,597; 5,762,810; 5,750,024; 5,656,173; 5,643,431; 5,616,244; 5,575,896; 5,565,078; 5,500,132; 5,480,547; 5,480,547; 5,468,385; 5,454,945; 5,454,937; 5,439,588; 5,417,848; 5,401,404; 5,242,604; 5,174,907; 5,156,745; 5,112,498; 5,080,802; 5,068,035; 5,037,454; 5,006,260; 4,888,117; 4,790,947; 4,759,782; 4,643,834; 4,640,781; 4,304,671; 4,251,369; 4,213,863; 4,199,447; 4,083,778; 4,078,965; 4,052,316; 4,039,441; 3,960,719; 3,951,814; and U.S. published Application Nos. 2007-0289915; 2007-0107399; 2007-0062887; 2007-0062886; and 2007-0039865; the contents of which are incorporated herein by reference in their entireties.) The coalescing media disclosed herein may be manufactured utilizing methods known in the art and may include additional features disclosed in the art. (See, e.g., U.S. Pat. Nos. 6,767,459; 5,443,724; and 4,081,373; and U.S published Patent Application Nos. 2007-0131235; 2007-0062887; and 2006-0242933; the contents of which are incorporated herein by reference in their entireties.). For example, the coalescing media disclosed herein may be manufactured by combining multiple layers of media having distinct porosities ($\epsilon$) or mean flow pore diameters (M) by utilizing a melt-blown process or other processes. The coalescing media may be manufactured as a composite media comprising at least three layers as contemplated herein. Alternatively, the coalescing media may be manufactured by laying at least three discrete layers on top of each other and physically coupling the layers together using one or more methods such as pressure coupling, clamping, pleating, needle punching, thermal bonding, ultrasonic bonding, chemical adhesion, and the like.

In some embodiments of the disclosed coalescing media, a first layer (15 μm mean flow pore diameter), a second layer (50 μm mean flow pore diameter), and a third layer (5 μm mean flow pore diameter) may be combined. In another embodiment, optionally a pre-layer (125 μm mean flow pore diameter), a first layer (10 μm mean flow pore diameter), a second layer (100 μm mean flow pore diameter), a third layer (5 μm mean flow pore diameter), and optionally a post-layer (50 μm mean flow pore diameter) may be combined. In a further embodiment, optionally a pre-layer (100 μm mean flow pore diameter), a first layer (10 μm mean flow pore diameter), a second layer (50 μm mean flow pore diameter), a third layer (5 μm mean flow pore diameter), and optionally a post-layer (50 μm mean flow pore diameter) may be combined. In the manufacturing process, the post-layer or the "effluent layer" (i.e., the most distal downstream layer) may be bonded to the upstream adjacent layer in order to prevent the effluent layer from being pulled downstream (e.g., by utilizing ultrasonic welding or other means). Alternatively, a course "binder" layer may be applied at the downstream face of the fibrous media in order to prevent media migration. Coarse binder material may include relatively rigid mesh material. In some embodiments, the second layer or the post-layer comprise rigid material to facilitate forming the coalescing media into a pleated structure.

The coalescence process as disclosed herein may be understood to comprise a series of steps including: (1) capture of droplets by the coalescer media; (2) coalescence and drop growth in the media; (3) drainage of coalesced drops through the media; and (4) release of coalesced drops from the media. Coalescers typically utilize coalescing media with decreasing pore size, fiber diameter, and/or porosity to capture increasingly smaller droplets and concentrate them to facilitate coalescence. (See FIG. 2.) This aspect is referred to as graded capture. When the coalesced drops become large enough, drag induces them to flow through the media until they are released, typically on the downstream side of the coalescer. (See FIG. 1.) In some applications, notably crankcase ventilation, coalesced drops may drain down due to gravity and be released at the bottom of the coalescer. A final coarser, release layer of media with larger pore size, fiber diameter and/or porosity may be located at the downstream face of the coalescer to ensure the release of enlarged drops and to reduce the break-up of coalesced drops. (See, e.g., Post-layer, FIG. 5.)

Further referring to the coalescing media illustrated in FIG. 5, the media comprises five layers:

Pre-layer. Solids and semi-solids removal layer. The Pre-layer is configured for removal and retention of solid particles to increase coalescer life, and to capture droplets 66, initiate growth and coalescence of droplets.

Layer #1. Layer #1 is configured for capture of finer droplets and droplet growth due to coalescence 68.

Layer #2. Quiescent layer. Coalesced drops from Layer #1 are released into Layer #2 as enlarged drops 70 and further capture of solids or semi-solids may occur in Layer #2. In Layer #2, the velocity of the fluid and drops decreases and drops assume a more spherical shape with reduced surface area 72 relative to drops of Layer #1. Drops are held up and concentrated at the interface 74 of Layer #2 and Layer #3. This inner layer with larger pore size and higher porosity than adjacent layers provides a low velocity zone immediately prior to a smaller pore, lower porosity, tortuous layer. As drop enter Layer #3, their velocity accelerates relative to their velocity in Layer #2, causing them to elongate in shape. The drops also may elongate because Layer #3 has a smaller pore size. Adjacent droplets may form two facing nipples in the contact area between them. Coalescence of the droplets is hastened in Layer #2 and cascading coalescence to other adjacent water droplets that had been concentrated at the downstream face of this layer occurs. Due to a smaller pore size for Layer #3 relative to the pore size for Layer #2, a lower porosity for Layer #3 relative to the porosity for Layer #2, and a higher tortuosity for Layer #3 relative to the tortuosity for Layer #2, drops entering Layer #3 deform and increase in surface area. For these same reasons, drops entering Layer #3 experience a temporary increase in interfacial tension that may be sufficient to overcome the interfacial tension lowering effects of some surfactants present in water-hydrocarbon liquid mixtures.

Layer #3. Cascade coalescence layer. Due to its smaller pores, more tortuous flow path, lower porosity, and reduced wettability for coalescing drops relative to Layer #2, drops are held up and concentrated at the interface 74 of Layer #2 and Layer #3 until the local pressure drop across the drops exceeds capillary pressure in Layer #3. At this point, drops enter Layer #3 76 where the fluid velocity increases, their surface area and corresponding interfacial tension increases and coalescence among neighboring drops is triggered. In order to minimize break-up of drops in this tighter layer, the thickness of Layer #3 is preferably smaller than the thickness of Layer #2.

Post-layer. Drop release layer. Coalesced drops from Layer #3 are expelled into Post-layer 78. The velocity of the drops in the Post-layer is reduced relative to Layer #3. In addition, the pore size, fiber diameter and/or porosity are larger for the Post-layer (relative to Layer #3), in order to further minimize the breakup of coalesced drops into smaller drops and maximize the size of release drops 80.

This invention can be applied to any set of immiscible fluids, such as water in diesel fuel, water in biodiesel fuel, oil in water, and crankcase oil from engine blow-by gases. Depending on the application, there may be a separate stripping or separator stage, positioned downstream of the coalescing media (or downstream of a coalescing element comprising the coalescing media), further to remove coalesced drops from the mixture. The separate stripping or separator stage may be positioned such that there is a gap between the coalescing media (or element) and the separate stripping or separator stage where the coalescing media or element (first stage) is not in direct contact with the separate stripping or separator stage (second stage). In further embodiments, the coalescing media is present in a coalescing system that further includes a device for removing drops that are coalesced by the coalescing media. For example, a coalescent system further may include one or more of a gravity separator, centrifuge, impactor, lamella separator, inclined stacked plate, screen, quiescent chamber, and the like.

In this invention, the properties and characteristics of the various layers may be defined, in part, in terms of changes in the local fluid velocity and capillary pressure in layers relative to one another and, potentially relative to the conditions of the application. Local fluid velocity may be defined as:

$$U_I = \frac{U_0}{\varepsilon_I}$$

where U=local fluid velocity;
$\varepsilon$=porosity of the media; and
I=subscript indicating the layer; and
0 refers to the upstream face velocity (i.e., of the coalescer as a whole).

In this invention, the capillary pressure of a layer may be defined as:

$$P_I = \frac{2\gamma\cos\theta_I}{M_I}$$

where P=local capillary pressure for the indicated layer;
$\gamma$=interfacial tension;

θ=contact angle of a drop on the media in the fluid for the indicated layer; and M=mean flow pore diameter for the indicated layer.

In the following discussion, when comparing capillary pressures of adjacent layers, the variable terms γ will cancel out, because the two layers will be contacted with the same fluid simultaneously.

Figure 6:
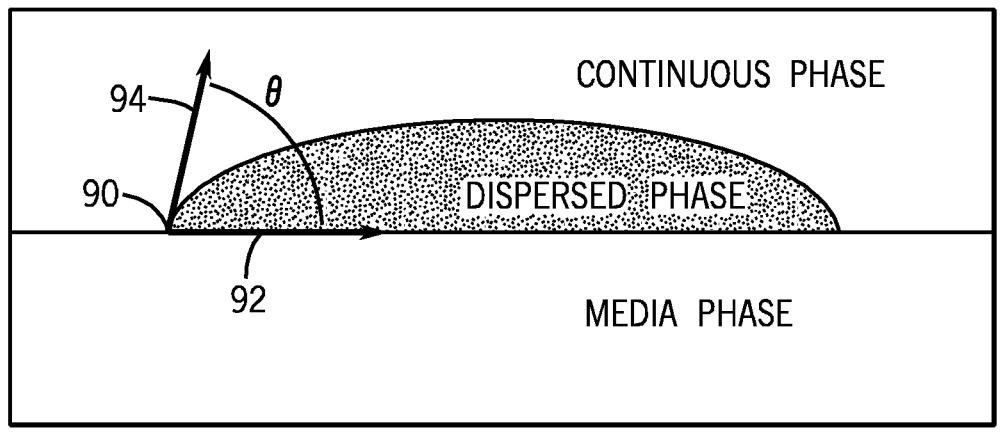
FIG. 6 illustrates a method for determining contact angle $\theta$ for a dispersed drop on a media phase.

The contact angle θ may be defined as in FIG. 6. The contact angle θ may be defined as an angle having its vertex 90 at the intersection of the continuous phase, dispersed phase, and media phase with one ray 92 extending parallel to the media surface from the vertex and the other ray 94 extending tangentially to the surface of the dispersed phase at the vertex. Typically, the angle θ is reported as being measured through the dispersed phase. In some embodiments, the contact angle may be measured for a droplet on an individual fiber. In other embodiments, the contact angle may be measured for a droplet on a patch of filter media.

To take advantage of the traditional and newly described coalescence mechanisms (e.g., the traditional graded capture mechanism, velocity-enhanced coalescence, and surface area enhanced coalescence), the physical, structural, and surface properties of each layer may be optimized.

Referring again to FIG. 5, the following optimization rules may be followed:

The Pre-layer preferably should be more open than Layer #1. Ideally, the contact angle of drops should be greater than 45°, i.e., the layer should not be strongly wetted by the coalescing drops.

Layer #1 preferably should be tighter than both the Pre-layer and Layer #2. In order to facilitate the flow of captured drops from the Pre-layer to Layer #1, the capillary pressure of Layer #1 relative to the Pre-layer ideally may be defined by the following equation:

$$\frac{\cos\theta_1}{M_1} \geq \frac{\cos\theta_{Pre}}{M_{Pre}}$$

where θ=contact angle of a drop on a fiber of filter media in the fluid;

M=mean flow pore size; and subscripts indicate the layer.

In addition, the contact angle of Layer #1 preferably should not be strongly wetting nor non-wetting, i.e., $45°<\theta_1<135°$. These conditions may be desirable in order to facilitate the movement of captured and coalesced droplets from the Pre-layer to Layer #1, even under operating conditions of changing flow rate. In addition, $M_1<M_{Pre}$ in order to facilitate removal of larger particles in the more open Pre-layer, where their capture will less adversely impact pressure drop, as opposed to Layer #1.

Layer #2 preferably should be more open than Layer #1 and Layer #3. The capillary pressure of Layer #2 preferably should not be excessively low relative to Layer #1. Excessively low capillary pressure in Layer #2 may refer to a condition in which the media capillary pressure is so negative that normal drag forces on the drops due to fluid flow are insufficient to force them into Layer #2. In general, it is desirable to minimize the accumulation of drops at the Layer #1-Layer #2 interface, while encouraging the buildup of captured and coalesced drops at the Layer #2-Layer #3 interface. Ideally, the capillary pressure of Layer #2 relative to Layer #1 may be defined by the following equation:

$$\frac{\cos\theta_2}{M_2} \geq \frac{\cos\theta_1}{M_1} \text{ or } \frac{\cos\theta_2}{M_2} \approx \frac{\cos\theta_1}{M_1}$$

In addition, the contact angle of Layer #2 preferably should be neither strongly non-wetted nor strongly wetted by the drops, i.e., $60°<\theta_2<135°$, in order to encourage drops to facilitate the flow of drops into Layer #3 when local pressure conditions are favorable. Further, $M_1<M_2$ in order to facilitate movement of drops into Layer #2. The thickness of Layer #2 preferably should be greater than that of Layer #3 and preferably should be the diameter of coalesced drops leaving Layer #1 or larger. Thus, Layer #2 preferably should be at least 30 µm thick, but may be thicker.

Layer #3 preferably should be tighter than the Pre-layer, Layer #2, and the Post-layer. In order to enhance the buildup of drops at the Layer #3-Layer #2 interface, the capillary pressure of Layer #3 relative to Layer #2 ideally may be defined by the following equation:

$$\frac{\cos\theta_2}{M_2} \geq \frac{\cos\theta_3}{M_3}$$

In addition, the contact angle of Layer #3 preferably should be non-wetting, i.e., $\theta_3>90°$, and ideally, $\theta_3>120°$. Further, $M_3<M_2$ and $\epsilon_3<\epsilon_2$ in order to: (1) facilitate accumulation of drops at the Layer #2-Layer #3 interface, (2) increase velocity in Layer #3, and (3) increase drop surface area in Layer #3. Finally, Layer #3 preferably should be thin in order to minimize restriction and to reduce breakup of coalesced drops as they are released to a Post-layer.

The Post-layer preferably should be more open than Layer #3. In order to facilitate the flow of drops from Layer #3 to the Post-layer, the capillary pressure of the Post-layer relative to Layer #3 ideally may be defined by the following equation:

$$\frac{\cos\theta_3}{M_3} \leq \frac{\cos\theta_{Post}}{M_{Post}}$$

In addition, the contact angle of the Post-layer preferably should be non-wetted by the drops, i.e., $90°>\theta_{Post}$, and ideally, $120°>\theta_{Post}$, in order to encourage drops to release easily from the Post-layer without break up. For the same reason, $M_3<M_{Post}$ and $\epsilon_{Post}>\epsilon_3$.

The preceding discussion provided exemplary rules and optimal relationships among the variables P, θ, M, ε, and thickness for the various layers. The preferred values selected ultimately may depend upon: the concentration and size distribution of solids and semi-solids in the fluid upstream of the Pre-layer, as the properties of this layer influence the life of the coalescer; and the upstream droplet size distribution, and the anticipated γ, interfacial tension for application, directly impact the design of Layers #1, #2 and #3.

In some embodiments of the methods for removing water from diesel fuel, it has been found that water removal is on the order of 99% when γ=~25 dyne/cm, $M_2$=7.1 µm, and θ=~80°. From the Gibbs Equation, the following relationship between γ and D (droplet diameter) may be derived for a system in which the interfacial tension changes (i.e., the Gibbs Free Energy to produce the drops, ΔG, is the same for the two systems). The relationship γ and D is:

$$\Delta G = \gamma_l \Delta A = \gamma_l \pi [n_l D_l^2]$$

$$c = \frac{n_l \pi D_l^3}{6}$$

$$\Delta G = \gamma_l \Delta A = \gamma_l \pi \frac{[6cD_l^2]}{\pi D_l^3} = \frac{6c\gamma_l}{D_l}$$

$$\frac{\gamma_A}{D_A} = \frac{\gamma_B}{D_B}$$

$$D_B = \frac{\gamma_B D_A}{\gamma_A}$$

where the subscripts refer to two systems of different interfacial tensions. If it is further assumed that there is a linear relationship between D for a given γ and the $M_2$ needed to achieve the desired removal at the same γ, then the following equation is obtained which can be used to used to guide choices for the remaining properties and layers:

$$M_B = \frac{\gamma_B M_A}{\gamma_A}$$

Then, for the previously described γ and M for Layer #2 and traditional diesel fuel systems, the following equation is provided:

$$M_B = \frac{\gamma_B 7.1}{25}$$

Figure 7:
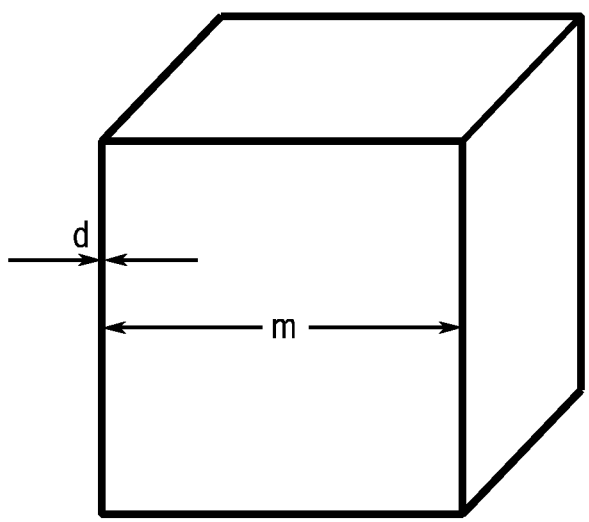
FIG. 7 provides a unit cube as a model for determining M as a function of d (fiber diameter) and $\epsilon$ as further discussed herein.

The variable M may be utilized to characterize the filter media. M is a function of d, fiber diameter, and ε. As an approximation, a layer may be modeled as a series of unit cubes as shown in FIG. 7. M is the equivalent diameter of pores, as determined by a porometer. In the model, the face of a unit cell is a square with the open area equivalent to the circular cross-section assumed by the porometer. A length of a side of this square, m, is:

$$\frac{\pi M^2}{4} = m^2$$

$$m = \frac{M\sqrt{\pi}}{2}$$

The total volume of the unit cube, $V_T$, is $$V_T = (m+d)^3$$

where d=fiber diameter of the media.
The volume of the fibers in this unit cube, $V_f$, is:

$$V_f = \frac{3\pi(m+d)d^2}{4}$$

and the ε estimated from knowledge of M and d:

$$\varepsilon = 1 - \frac{V_f}{V_T}$$

and from knowledge of any two of M, d and ε, the third term can be estimated.

These disclosed principles may be utilized to design a multi-layer coalescing media that exhibits superior performance. The coalescing media disclosed herein typically includes at least three adjacent layers that extend in series from upstream to downstream, namely a first layer, a second layer, and a third layer. (Optionally, the fibrous media includes one or more additional upstream or downstream layers, such as an additional upstream layer (i.e., a "pre-layer") and/or an additional downstream layer (i.e., a "post-layer") for a total of four or five layers.) The first layer, the second layer, and the third layer of the at least three adjacent layers have mean flow pore diameters ($M_1$, $M_2$, and $M_3$, respectively); cosine of contact angles (cos $\theta_1$, cos $\theta_2$, and cos $\theta_3$, respectively); porosities ($\epsilon_1$, $\epsilon_2$, and $\epsilon_3$, respectively); fiber diameters ($d_1$, $d_2$, and $d_3$, respectively); and length of a side of a unit cell ($m_1$, $m_2$, and $m_3$, respectively).

In some embodiments of the coalescing media, the first layer has the following characteristics: a mean flow pore diameter $M_1$ of about 1-30 microns (preferably 3-15 microns, more preferably about 5-10 microns, and even more preferably about 6-8 microns); a cosine of $\theta_1$ of preferably about $^-0.71$-0.71 (i.e., preferably 45°≦$\theta_1$≦135°); a porosity $\epsilon_1$ of about 0.85-0.95 (preferably about 0.86-0.94, more preferably about 0.88-0.92, even more preferably about 0.90-0.92); a fiber diameter $d_1$ of about 1-10 microns (preferably about 1-6 microns, more preferably about 1-4 microns, even more preferably about 2-4 microns); and a thickness $T_1$ of about 0.1-1 mm (preferably about 0.2-0.8 mm, more preferably about 0.3-0.7 mm, even more preferably about 0.4-0.6 mm).

In some embodiments of the coalescing media, the second layer has the following characteristics: a mean flow pore diameter $M_2$ of about 10-100 microns (preferably 20-80 microns, more preferably about 30-70 microns, and even more preferably about 40-60 microns); a cosine of $\theta_2$ of preferably about $^-0.71$-0.5 (i.e., preferably 60°≦$\theta_1$≦135°); a porosity $\epsilon_2$ of about 0.90-0.99 (preferably about 0.93-0.99, more preferably about 0.94-0.98, even more preferably about 0.95-0.97); a fiber diameter $d_2$ of about 5-50 microns (preferably about 5-25 microns, more preferably about 10-20 microns, even more preferably about 12-18 microns); and a thickness $T_2$ of about 0.05-1 mm (preferably about 0.05-0.5 mm, more preferably about 0.05-0.3 mm, even more preferably about 0.05-0.15 mm).

In some embodiments of the coalescing media, the third layer has the following characteristics: a mean flow pore diameter $M_3$ of about 0.1-10 microns (preferably 1-8 microns, more preferably about 3-7 microns, and even more preferably about 4-6 microns); a cosine of $\theta_3$ of preferably less than about 0 or more preferably less than about $^-0.5$ (i.e., preferably $\theta_3$≧90°, or more preferably $\theta_3$≧120°); a porosity $\epsilon_2$ of about 0.80-0.95 (preferably about 0.85-0.95, more preferably about 0.90-0.94, even more preferably about 0.91-0.93); a fiber diameter $d_3$ of about 0.5-5 microns (preferably about 0.5-3.5 microns, more preferably about 1-3 microns, even more preferably about 1.5-2.5 microns); and a thickness $T_3$ of about 0.01-0.5 mm (preferably about 0.01-0.25 mm, more preferably about 0.01-0.15 mm, even more preferably about 0.05-0.1 mm).

The disclosed principles may be utilized to design a multi-layer coalescing media that exhibits superior performance in coalescers, systems, and methods for removing a dispersed phase (e.g., water) from a continuous phase (e.g., hydrocarbon fuel). For example, the disclosed coalescing media may be configured for use in systems for removing a dispersed phase from a continuous phase where the system removes at least about 93, 94, 95, 96, 97, 98, or 99% of the dispersed phase from the continuous phase.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible. The afore-cited patents and published applications are incorporated herein by reference in their entireties.

What is claimed is:

1. A coalescing media for coalescing a mixture of two phases, namely a continuous phase and a dispersed phase, the mixture flowing through the media from upstream to downstream, the media comprising at least three adjacent layers of fibrous coalescing media material that extend in series from upstream to downstream, namely a first layer, a second layer, and a third layer, wherein the first layer, the second layer, and the third layer have porosities $\epsilon_1$, $\epsilon_2$, and $\epsilon_3$, respectively, and $\epsilon_2 > \epsilon_1$ and $\epsilon_2 > \epsilon_3$, wherein the media is configured for capturing droplets of the dispersed phase and coalescingly growing the droplets into larger drops which further coalesce and grow to a sufficient size whereby they are released from the media, and wherein the first layer, the second layer, and the third layer have respective solidities, the solidity for the second layer being no more than about 75% as much as the solidity for the first layer, and the solidity for the second layer being no more than about 75% as much as the solidity for the third layer, and wherein the first layer, the second layer, and the third layer have mean flow pore diameters, $M_1$, $M_2$, and $M_3$, respectively, and $M_2$ is about 10-100 μm.

2. The coalescing media according to claim 1, wherein the continuous phase and the dispersed phase are immiscible liquids.

3. The coalescing media according to claim 2, wherein the continuous phase is a hydrocarbon liquid and the dispersed phase is water.

4. The coalescing media according to claim 2, wherein the continuous phase is water and the dispersed phase is hydrocarbon liquid.

5. The coalescing media according to claim 1, wherein the continuous phase is a gas and the dispersed phase is a liquid.

6. The coalescing media according to claim 1, wherein the first layer, the second layer, and the third layer have respective solidities, the solidity for the second layer being no more than about 50% as much as the solidity for the first layer, and the solidity for the second layer being no more than about 50% as much as the solidity for the third layer.

7. The coalescing media according to claim 1, wherein $M_2 > M_1$ and $M_2 > M_3$.

8. The coalescing media according to claim 7, wherein $M_2$ is at least about 1.5 times greater than $M_1$ and wherein $M_2$ is at least about 1.5 times greater than $M_3$.

9. The coalescing media according to claim 7, wherein $M_2$ is at least about 2 times greater than $M_1$ and wherein $M_2$ is at least about 2 times greater than $M_3$.

10. The coalescing media according to claim 1, wherein the first layer, the second layer, and the third layer have capillary pressures, $P_1$, $P_2$, and $P_3$, respectively; $P_2 \geq P_3$; and $P_2 \geq P_1$.

11. The coalescing media according to claim 10, wherein capillary pressure for a layer is defined by an equation $2\gamma \cos \theta / M$, wherein $\gamma$ is interfacial tension, $\theta$ is a contact angle for a drop of dispersed phase in the continuous phase on the layer, and M is mean flow pore diameter for the layer.

12. The coalescing media according to claim 11, wherein the first layer has a contact angle $\theta_1$, and $45° \leq \theta_1 \leq 135°$.

13. The coalescing media according to claim 11, wherein the second layer has a contact angle $\theta_2$, and $60° \leq \theta_2 \leq 135°$.

14. The coalescing media according to claim 11, wherein the third layer has a contact angle $\theta_3$, and $\theta_3 \geq 90°$.

15. The coalescing media according to claim 1, wherein the coalescing media is composite material.

16. The coalescing media according to claim 1, wherein the coalescing media is formed by obtaining a first media material, a second media material, and a third media material, and physically or chemically coupling the first media material, the second media material, and the third media material in layers.

17. A coalescing element comprising the coalescing media according to claim 1.

18. The coalescing element of claim 17, wherein the coalescing media is contained in a housing, the housing having an upstream inlet structured to receive the mixture and a downstream outlet structured to discharge the mixture after coalescing of the dispersed phase.

19. A coalescing system comprising the coalescing element according to claim 17.

20. The coalescing system according to claim 19, configured for removing water dispersed in hydrocarbon fuel.

21. The coalescing system according to claim 20, further comprising a hydrophobic media for removing water positioned downstream of the coalescing element.

22. The coalescing system according to claim 20, further comprising an additional device for removing water positioned downstream of the coalescing element, the device selected from a group consisting of gravity separator, centrifuge, impactor, lamella separator, inclined stacked plate, screen, and quiescent chamber.

23. The coalescing system according to claim 22, wherein the additional device does not directly contact the coalescing element.

24. A coalescing media for coalescing a mixture of two phases, namely a continuous phase and a dispersed phase wherein the continuous phase is a hydrocarbon liquid and the dispersed phase is water, the mixture flowing through the media from upstream to downstream, the media comprising at least three adjacent layers of fibrous coalescing media material that extend in series from upstream to downstream, namely a first layer, a second layer, and a third layer, wherein the first layer, the second layer, and the third layer have porosities $\epsilon_1$, $\epsilon_2$, and $\epsilon_3$, respectively, and $\epsilon_2 > \epsilon_1$ and $\epsilon_2 > \epsilon_3$, wherein the media is configured for capturing droplets of the dispersed phase and coalescingly growing the droplets into larger drops which further coalesce and grow to a sufficient size whereby they are released from the media;

wherein the first layer, the second layer, and the third layer have mean flow pore diameters, $M_1$, $M_2$, and $M_3$, respectively, $M_1$ is about 5-10 μm, $M_2$ is about 10-100 μm, and $M_3$ is about 1-5 μm; and wherein the first layer, the second layer, and the third layer have respective solidities, the solidity for the second layer being no more than about 75% as much as the solidity for the first layer, and the solidity for the second layer being no more than about 75% as much as the solidity for the third layer.

25. A coalescing media for coalescing a mixture of two phases, namely a continuous phase and a dispersed phase, the mixture flowing through the media from upstream to downstream, the media comprising at least three adjacent layers of fibrous coalescing media material that extend in series from upstream to downstream, namely a first layer, a second layer, and a third layer, wherein the first layer, the second layer, and the third layer have porosities $\epsilon_1$, $\epsilon_2$, and $\epsilon_3$, respectively, and $\epsilon_2 > \epsilon_1$ and $\epsilon_2 > \epsilon_3$, wherein the media is configured for capturing droplets of the dispersed phase and coalescingly growing the droplets into larger drops which further coalesce and grow to a sufficient size whereby they are released from the media, wherein the first layer, the second layer, and the third layer have respective solidities, the solidity for the second layer being no more than about 75% as much as the solidity for the first layer, and the solidity for the second layer being no more than about 75% as much as the solidity for the third layer, and wherein the first layer, the second layer, and the third layer have thicknesses $T_1$, $T_2$, and $T_3$, respectively; $T_2 > T_3$; and $T_2 > T_1$, and wherein the first layer, the second layer, and the third layer have mean flow pore diameters, $M_1$, $M_2$, and $M_3$, respectively, and $M_2$ is about 10-100 µm.

* * * * *